United States Patent
Torigoe

(10) Patent No.: US 8,659,791 B2
(45) Date of Patent: Feb. 25, 2014

(54) LED EMISSION WAVELENGTH ESTIMATION METHOD, IMAGE READING APPARATUS, AND MULTIFUNCTION PRINTER APPARATUS

(75) Inventor: Makoto Torigoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 514 days.

(21) Appl. No.: 12/835,702

(22) Filed: Jul. 13, 2010

(65) Prior Publication Data

US 2011/0032550 A1    Feb. 10, 2011

(30) Foreign Application Priority Data

Aug. 5, 2009 (JP) ................................ 2009-182889

(51) Int. Cl.
*H04N 1/60* (2006.01)
*G06T 5/00* (2006.01)
*H04N 1/46* (2006.01)

(52) U.S. Cl.
USPC ........... 358/1.9; 358/3.26; 358/501; 358/504; 358/530

(58) Field of Classification Search
None
See application file for complete search history.

(56) References Cited

U.S. PATENT DOCUMENTS

| 6,531,695 B2 * | 3/2003 | Fukazawa et al. | 250/239 |
| 2006/0127114 A1 * | 6/2006 | Mizuno | 399/49 |
| 2006/0239705 A1 * | 10/2006 | Ishibashi | 399/49 |

FOREIGN PATENT DOCUMENTS

| JP | 6-197218 | 7/1994 |
| JP | 2002-094814 | 3/2002 |
| JP | 2006-229351 | 8/2006 |

OTHER PUBLICATIONS

Fuji Xerox Technical Report #7, 1992.
Fuji Xerox Technical Report #7, 1992, p. 30, and partial English language translation thereof.

* cited by examiner

*Primary Examiner* — Firmin Backer
*Assistant Examiner* — Henok Shiferaw
(74) *Attorney, Agent, or Firm* — Fitzpatrick, Cella, Harper & Scinto

(57) ABSTRACT

In a prior art, since the wavelengths of R, G, and B LEDs serving as the light sources of a CIS scanner vary, read colors vary between individual scanners. Since the behavior of metamerism also changes due to the same reason, measures against the metamerism are hard to take. To solve this problem, a color patch is irradiated with light from an LED, and its spectral reflectivity is measured using a spectroreflectometer, thereby estimating the emission wavelength of the light source LED. A signal change characteristic representing the relationship to the output signals of three LEDs obtained from the spectral reflectivity of the patch is stored in a memory. In actual image reading, color correction is performed based on the signal change characteristic stored in the memory.

38 Claims, 13 Drawing Sheets

LED EMISSION WAVELENGTH ESTIMATION METHOD, IMAGE READING APPARATUS, AND MULTIFUNCTION PRINTER APPARATUS

BACKGROUND OF THE INVENTION

1. Field of the Invention

The present invention relates to an LED emission wavelength estimation method, an image reading apparatus, and a multifunction printer apparatus. Particularly, the present invention relates to an LED emission wavelength estimation method of estimating, for example, the emission wavelengths of the LEDs of a CIS sensor to be used to optically read an image original, an image reading apparatus, and a multifunction printer apparatus.

2. Description of the Related Art

A color scanner is known as an image reading apparatus which reads an image by switching light of different light emission wavelengths. Such a color scanner has a linear light source and an image sensor provided on a carriage movable in a predetermined direction. The light source includes LEDs capable of irradiating light emission wavelengths corresponding to three primary colors of light, that is, red (R), green (G), and blue (B). The carriage is moved in a direction (sub-scanning direction) perpendicular to the elongated direction (main scanning direction) of the linear light source. The liner image sensor receives reflected light obtained by irradiating an image original with light and reads the image original. To read the image original, a scanning read method is employed.

In the scanning read method, an original is read by switching three LEDs serving as a light source while conveying a CIS (Contact Image Sensor) unit in the sub-scanning direction. More specifically, the R component data of a color image is obtained by lighting a red LED. Next, the G component data is obtained by lighting a green LED. Finally, the B component data is obtained by lighting a blue LED. Image data of one line is obtained in one red, green, and blue LED lighting cycle. Image data of one page of the image original is obtained by repeating the lighting cycle while conveying the CIS unit in the sub-scanning direction.

The read image data then undergoes color correction processing by an image processing unit. The image data is thus corrected to values corresponding to a desired tone so that final read image data is obtained.

Generally, in color correction of such a color scanner, the colorimetric values (for example, CIE-L*a*b*) of color patches on the image original and the RGB output signals of the device that has read the color patches are made to match RGB values corresponding to the colorimetric values. This processing is executed using known arithmetic processing or a one- to three-dimensional lookup table (LUT) in a predetermined color space such as sRGB. Especially, to make colors nonlinearly match in a color space, a three-dimensional LUT is necessary in many cases.

Even a color patch having a matched colorimetric value changes the values of device RGB output signals between, for example, a silver halide photo and an inkjet photo printed on glossy paper because of the difference in spectral reflectivity generated by different color materials. This is known as a problem of metamerism. Techniques of coping with the problem of metamerism are disclosed in, for example, "Fuji Xerox Technical Report No. 7, 1992" p. 30, and Japanese Patent Laid-Open Nos. 6-197218 and 2002-094814.

"Fuji Xerox Technical Report No. 7, 1992 p. 30" discloses a technique of switching two sets of color correction parameters for printing and photographic paper in accordance with a user's original designation. Japanese Patent Laid-Open No. 6-197218 discloses a technique of automatically determining the original type based on the histogram of an image. Japanese Patent Laid-Open No. 2002-094814 discloses a technique of automatically determining the color material type by reading an image original under different read conditions.

The emission wavelengths of the LEDs of the light source of the conventional color scanner generally have a variation of about ±10 nm. If the emission wavelengths of the LEDs vary, the values of the above-described device RGB output signals change. Hence, even though color correction of making the values match the RGB values in a predetermined color space is performed, color shift still occurs. In addition, since color change by metamerism associated with the change of color materials also exhibits another behavior, the techniques of coping with the metamerism disclosed in the above-described references do not function well.

To cope with the variation in the wavelength of the color scanner light source, Japanese Patent Laid-Open No. 2006-229351 discloses a technique of reading a chromatic printer correction pattern by a scanner and correcting the tone characteristic of the reading apparatus. However, this technique does not measure the light source wavelength itself but detects only the variation in the tone characteristic of the reading apparatus by the wavelength variation of the light source using a patch of complementary color for the light source. Hence, this technique is not applicable to the problem of metamerism or the above-described color correction of making the colors match a color space using a three-dimensional LUT.

In a multifunction printer apparatus (MFP apparatus) that integrates a color scanner and a color printer, the printed colors of the printer have significant individual variations or time-rate changes.

SUMMARY OF THE INVENTION

Accordingly, the present invention is conceived as a response to the above-described disadvantages of the conventional art.

For example, an LED emission wavelength estimation method, image reading apparatus, and multifunction printer apparatus according to this invention are capable of solving the problem of metamerism and appropriately reading an image original.

According to one aspect of the present invention, there is provided an LED emission wavelength estimation method of estimating emission wavelengths of three LEDs which are mounted in an image reading apparatus to emit light of three primary colors, comprising: a test patch formation step of forming a test patch by printing on a printing medium using color materials; a first measurement of measuring a spectral reflectivity of the test patch formed on the printing medium using a spectroreflectometer; a second measurement of measuring emission wavelength characteristics of standard LEDs mounted in the image reading apparatus using a measuring device; a storage step of storing, into a memory, signal change characteristic data representing a relationship between signals corresponding to reflected light obtained by irradiating the test patch with the standard LEDs and a wavelength shift from a design wavelength of each of the standard LEDs, based on the spectral reflectivity measured in the first measurement step and the emission wavelength characteristics of the standard LEDs measured in the second measurement step; a patch formation step of forming a patch by printing on a printing medium using color materials; a reading step of reading the patch formed in the patch formation step, using the image reading apparatus including the memory and the three color LEDs; and an estimation step of estimating a wavelength shift from a design wavelength of each of the LEDs of the image reading apparatus, based on a signal obtained by reading the patch in the reading step and the signal change characteristic data stored in the memory.

According to another aspect of the present invention, there is provided an image reading apparatus which irradiates an image original with three LEDs for emitting light of three primary colors, receives reflected light of the light, and reads the image original based on the received light, comprising: a color correction unit configured to perform color correction of the read image original, based on a signal change characteristic stored in a memory in accordance with the above-mentioned method.

According to still another aspect of the present invention, there is provided a multifunction printer apparatus comprising: an image reading apparatus according to the above-mentioned image reading apparatus; and a printing unit configured to print an image on a printing medium, based on one of image data representing an image read by the above-mentioned image reading apparatus and externally input image data.

The invention is particularly advantageous since, for example, the emission wavelengths of the LEDs of the light source of a color scanner incorporated in an MFP apparatus are estimated, and color correction considering the wavelengths can be performed when the MFP apparatus reads an image original. This enables high-quality image reading without color shift.

In addition, the behavior of color change by the metamerism associated with the change of color materials of an image original can also be estimated from the wavelength of each LED.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings.

Note that in this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

The arrangement of a multifunction printer apparatus (to be referred to as an "MFP apparatus" hereinafter) to be used as a common embodiment will be described first.

<MFP Apparatus>

Figure 1A:
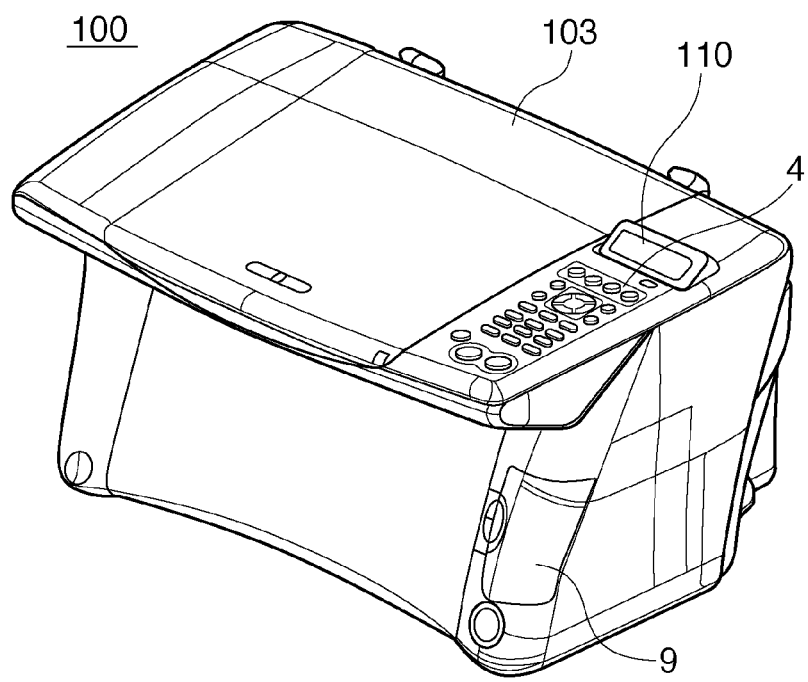
FIGS. 1A and 1B are perspective views showing the schematic arrangement of a multifunction printer (MFP) according to a typical embodiment of the present invention.
Figure 1B:
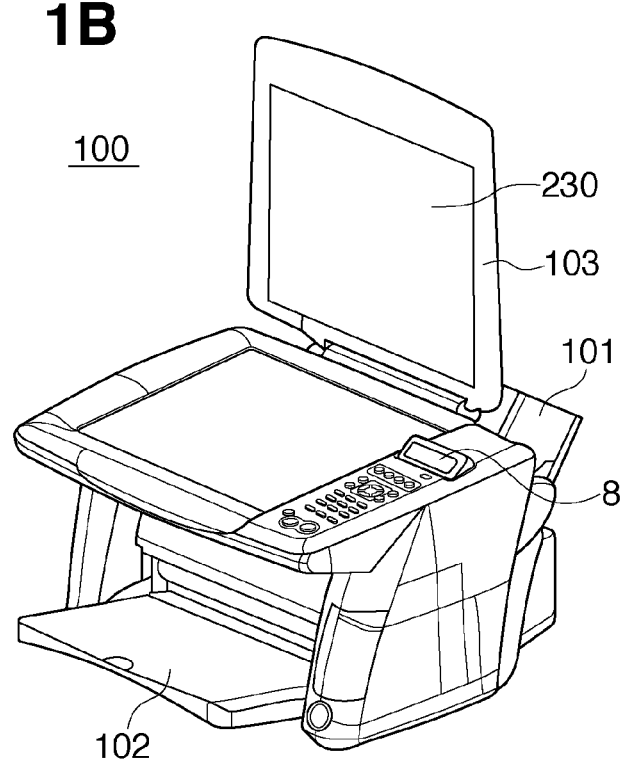

FIGS. 1A and 1B are perspective views showing the schematic arrangement of an MFP apparatus 100 according to a typical embodiment of the present invention.

The MFP apparatus can print an image on a printing medium such as a printing paper sheet based on image data from a connected host (not shown) or image data stored in a memory card, and also read and copy an image original.

FIG. 1A shows a state in which an original cover 103 is closed. FIG. 1B shows a state in which a printing medium tray 101, a discharge tray 102, and the original cover 103 are open.

A reading unit 8 including a CIS (Contact Image Sensor) unit reads an image original and outputs analog brightness signals of R, G, B components. A card interface 9 is used to receive a memory card in which image files taken by, for example, a digital still camera (not shown) are stored and read out image data from the memory card in accordance with a predetermined operation on an operation unit 4. The MFP apparatus 100 also includes a display unit such as an LCD 110. The LCD 110 is used to display contents set by the operation unit 4 or a function selection menu.

Figure 2:
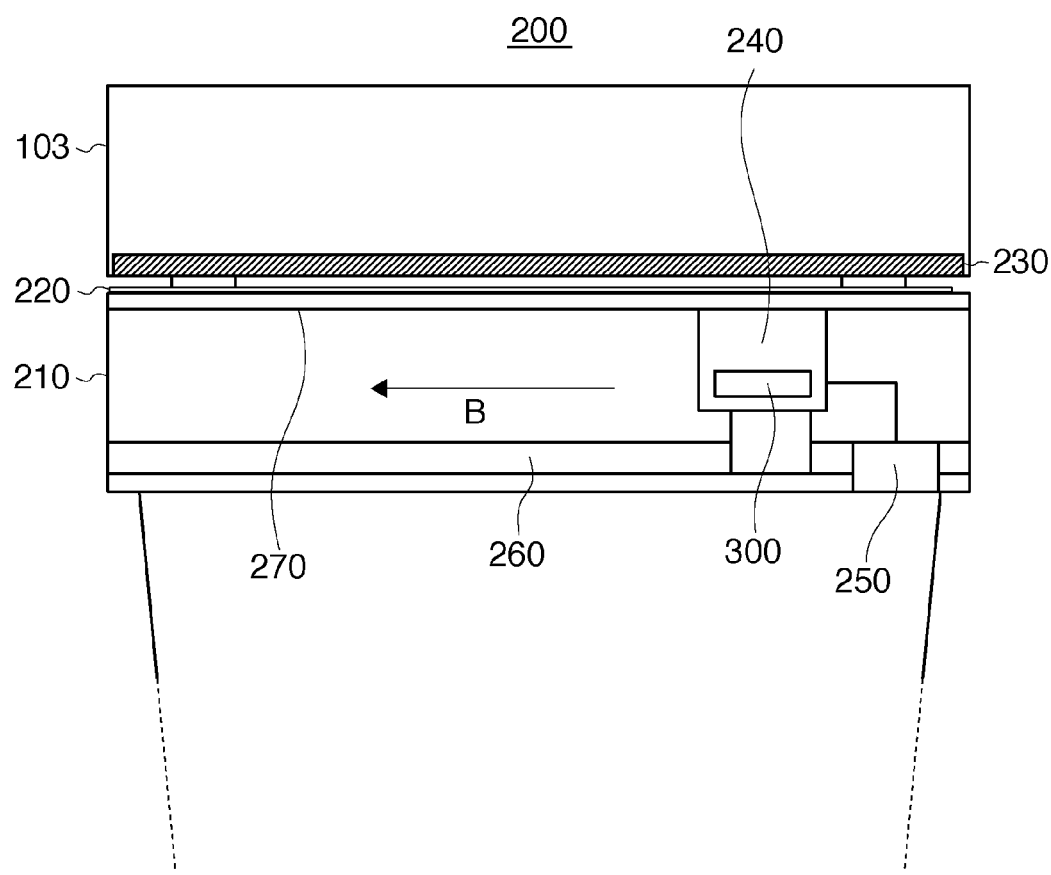
FIG. 2 is a sectional view of an image reading apparatus provided on the upper side of the MFP apparatus shown in FIGS. 1A and 1B.

FIG. 2 is a sectional view of an image reading apparatus provided on the upper side of the MFP apparatus shown in FIGS. 1A and 1B.

As shown in FIG. 2, an image reading apparatus 200 includes a main body 210 and a press plate 230 which presses an original 220 as a reading object and shields external light. The press plate 230 is set on the lower side of the original cover 103. The main body 210 includes an optical unit 240, a circuit board 250 electrically connected to the optical unit 240, a sliding rod 260 serving as a rail to scan the optical unit 240, and an original glass table 270. The optical unit 240 incorporates a CIS unit 300 which irradiates the original 220 with light, receives reflected light, and converts it into an electrical signal. In image reading, the optical unit 240 scans the original 220 placed on the original glass table 270 in the direction (sub-scanning direction) of an arrow B, thereby reading an image printed on the original 220.

Figure 3:
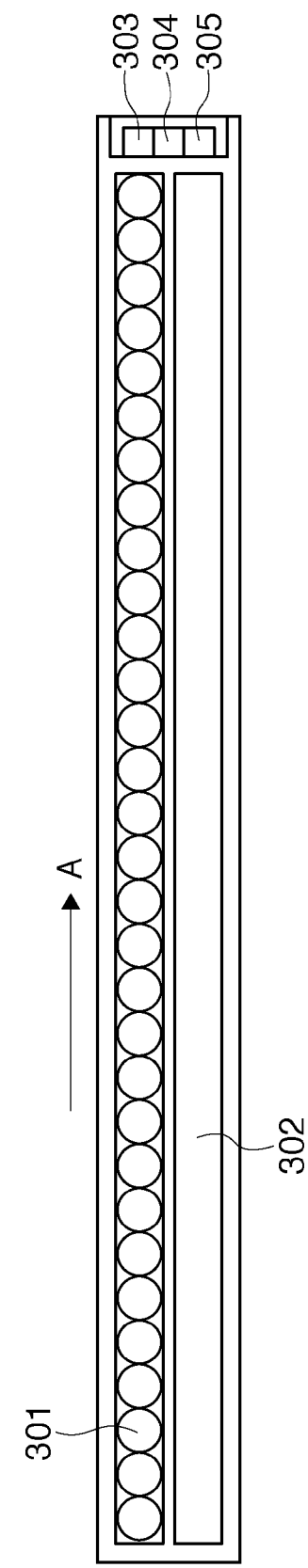
FIG. 3 is a side sectional view showing the detailed structure of a CIS (Contact Image Sensor) unit.

FIG. 3 is a side sectional view showing the detailed structure of the CIS unit 300.

As shown in FIG. 3, the CIS unit 300 includes a red LED 303 which emits red light, a green LED 304 which emits green light, and a blue LED 305 which emits blue light. In original reading, the respective color LEDs are time-divisionally turned on for each line. The original is uniformly irradiated with the emitted light via a light guide 302. A SELFOC® lens 301 condenses the reflected light for each pixel. An image of the light is formed on a photoelectric transducer (not shown) in the CIS unit so that the received light is converted into an electrical signal. An image signal of one line including R, G, and B color component signals is output in this way. The CIS unit 300 is moved in the sub-scanning direction, thereby reading the image all over the original. The direction of an arrow A which represents the cell array direction of the SELFOC® lens 301 is called a main scanning direction. The main scanning direction is perpendicular to the sub-scanning direction. In FIG. 2, the main scanning direction is perpendicular to the drawing surface.

Figure 4:
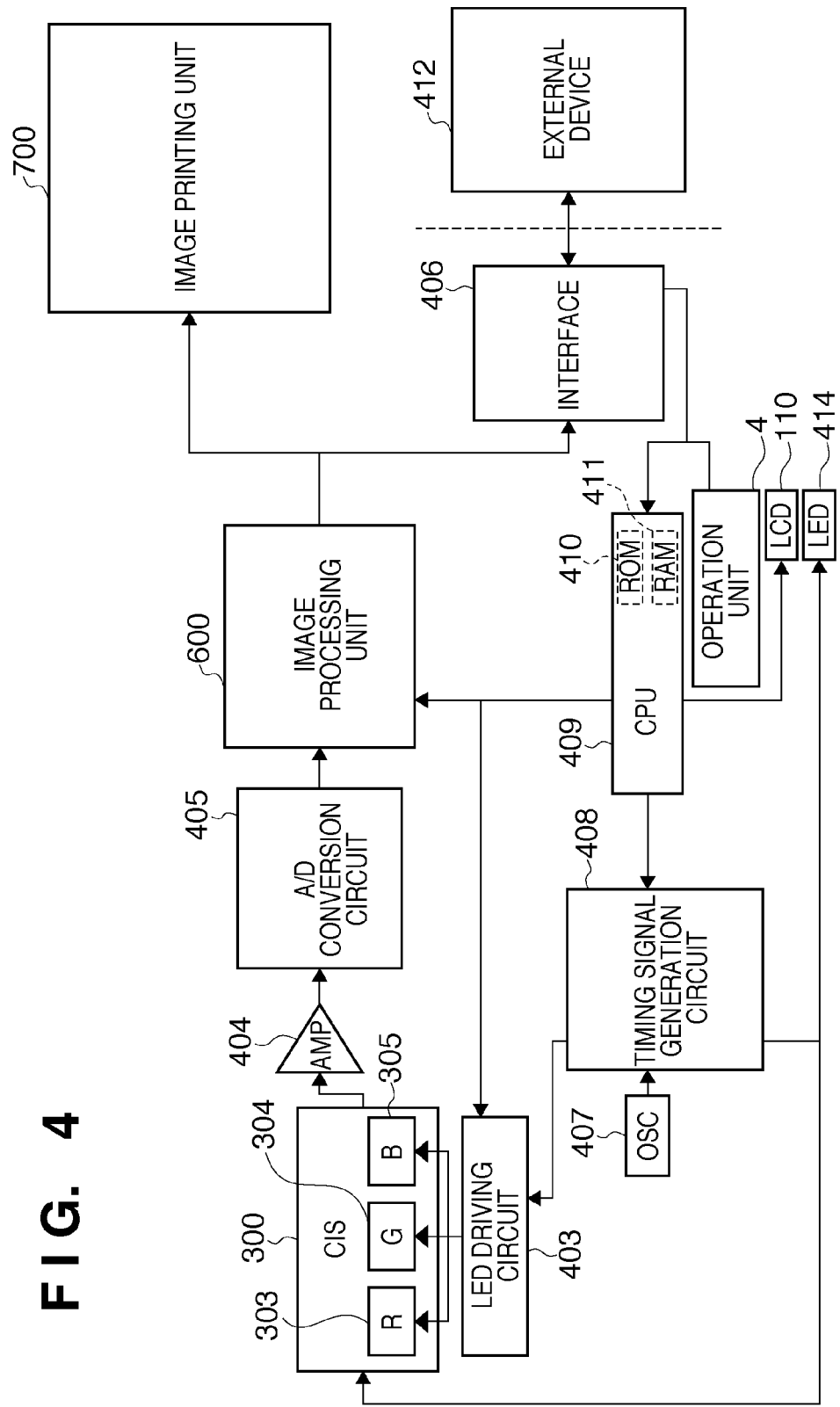
FIG. 4 is a block diagram showing the arrangement of the control circuit of the image reading apparatus.

FIG. 4 is a block diagram showing the arrangement of the control circuit of the image reading apparatus.

The same reference numerals as in FIGS. 1A, 1B, 2 and 3 denote already described constituent elements in FIG. 4, and a description thereof will not be repeated.

The CIS unit 300 line-sequentially reads a color image by causing an LED driving circuit 403 to selectively turn on the color LEDs 303 to 305 for each line. The LEDs 303 to 305 are light sources capable of changing the irradiation light amount on an original. The LED driving circuit 403 can arbitrarily turn on the LEDs 303 to 305.

More specifically, it is possible to sequentially turn on one or two of the LEDs 303 to 305 at a time or turn on all the three LEDs as needed. An amplifier (AMP) 404 amplifies the signal output from the CIS unit 300. An A/D conversion circuit 405 A/D-converts the amplified electrical signal and outputs, for example, 16-bit digital image data for each color component of each pixel. An image processing unit 600 processes the digital image data converted by the A/D conversion circuit 405. An interface control circuit (I/F) 406 reads out image data from the image processing unit 600 and transmits/receives control data to/from an external device 412 or outputs the image data. The image data from the image processing unit 600 can also be output to an image printing unit. The external device 412 is, for example, a personal computer (not shown).

An image printing unit 700 converts the image data from the interface control circuit 406 into binary data representing "print" or "not print" for each pixel and prints an image on a printing medium using printing materials. As the image printing unit 700, for example, an inkjet printer, a laser beam printer using an electrophotographic method, or a sublimation type printer is usable. These printers are known, and a detailed description thereof will be omitted.

The above-described series of processes is roughly classified into two types in accordance with the operation contents.

A copy or image reading (scanning) operation performed by the MFP apparatus alone will be described. In this case, the user of the apparatus inputs necessary instructions via the operation unit 4.

Figure 5:
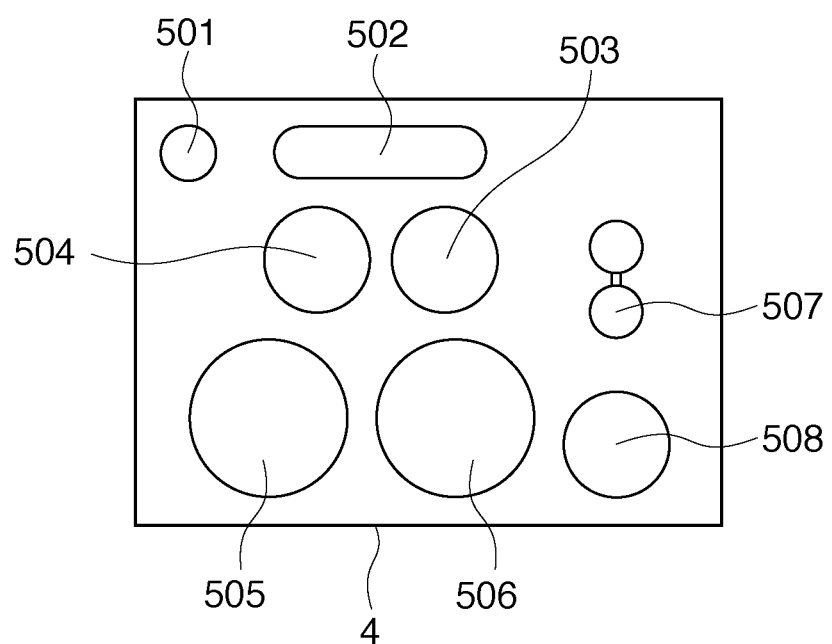
FIG. 5 is a view showing a detailed example of the arrangement of an operation unit.

FIG. 5 is a view showing a detailed example of the arrangement of the operation unit 4. The arrangement of the operation unit 4 will be described here with reference to FIG. 5.

The output signal from the operation unit 4 is connected to the input port of a CPU 409. A button 501 is a power key. A button 502 is a function selection button. Operable function contents are displayed on the LCD 110 in correspondence with the number of times the button 502 is pressed. Operations are set in accordance with the displayed function contents. When the user presses a determination button 503, the contents are set in a RAM 411. A button 504 is a cancel button. When the user presses a button 505, a color copy operation starts in accordance with the settings in the RAM 411. When the user presses a button 506, a monochrome copy operation starts in accordance with the settings in the RAM 411. The user presses a button 507 to designate the number of sheets or density. A button 508 is a reset button. The user can press the button 508 to cancel scanning or printing.

The description will be continued with reference to FIG. 4.

The above-described operation instruction from the operation unit 4 is controlled by the CPU 409 in the form of a microcomputer. The CPU 409 reads out a processing program ("control program 670" in FIG. 6 to be described later) stored in a ROM 410 and executes the control using the RAM 411 as a work area. Referring to FIG. 4, reference numeral 407 denotes a reference signal oscillator (OSC) such as a quartz oscillator, and reference numeral 408 denotes a timing signal generation circuit which divides the output of the reference signal oscillator 407 in accordance with the settings of the CPU 409 to generate various kinds of timing signals as the base of operations.

For an operation based on an instruction from a personal computer (external device 412), a copy or image reading (scanning) instruction is issued from the personal computer to the CPU 409. The operation from then on is the same as in the copy or image reading (scanning) operation performed by the MFP apparatus alone.

An LED 414 serves as the backlight source of the LCD 110 and is ON/OFF-controlled by a lighting signal output from the timing signal generation circuit 408.

Details of the image processing unit 600 will be described next.

Figure 6:
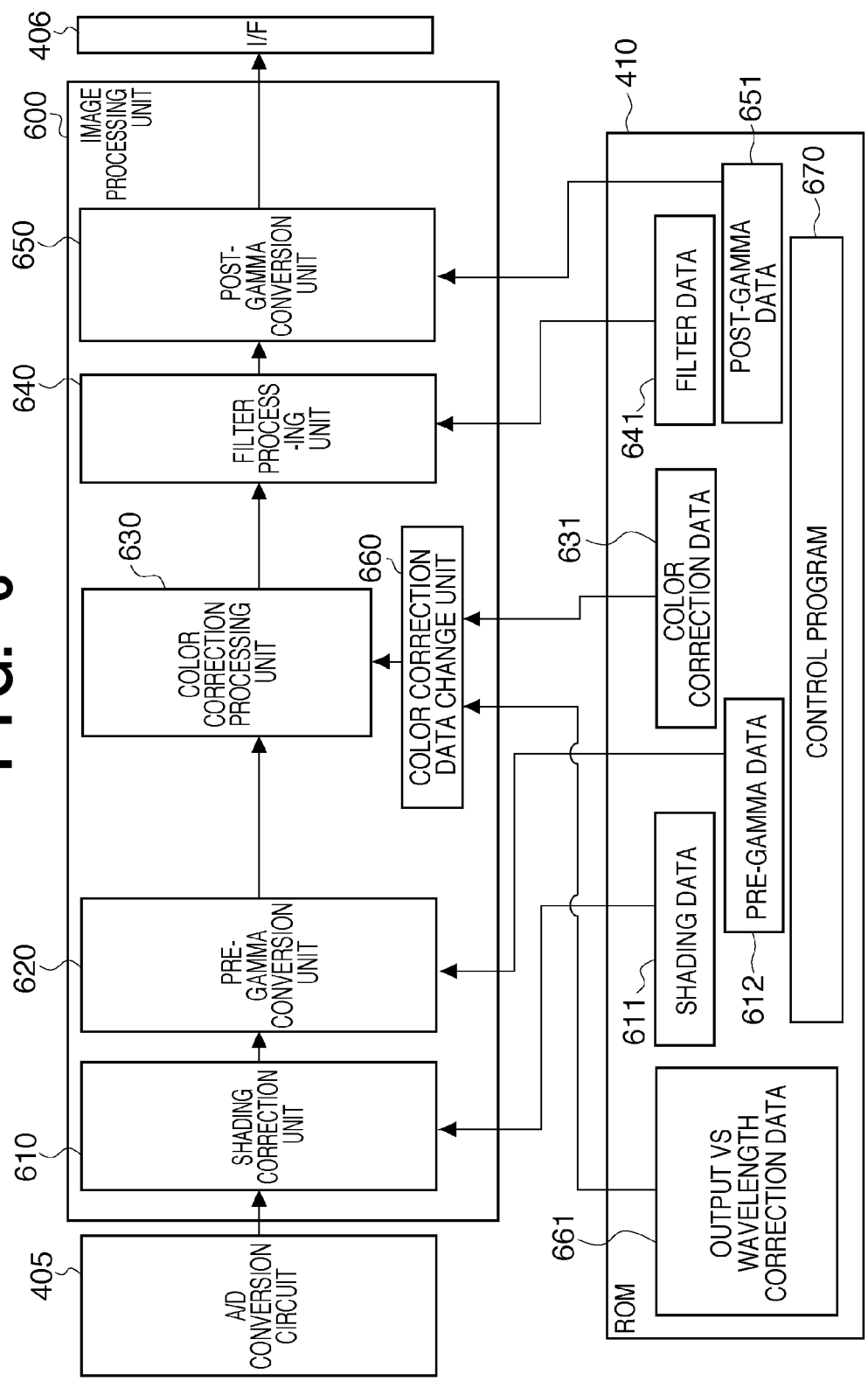
FIG. 6 is a block diagram showing the detailed arrangement of an image processing unit.

FIG. 6 is a block diagram showing the detailed arrangement of the image processing unit 600.

Digital image data converted by the A/D conversion circuit 405 is input to a shading correction unit 610. The shading correction unit 610 performs shading correction by reading a reference white board (not shown) bonded to the lower surface of an index plate (not shown) bonded to the original platen glass 270 of the image reading apparatus 200. The reference white board adheres to the original platen glass, and is therefore optically located on the same plane as an original.

Data used for the shading correction is shading data 611 stored in the ROM 410. The digital image data that has undergone the shading correction is input to a pre-gamma conversion unit 620. The pre-gamma conversion unit 620 performs gamma correction to obtain a visually preferable luminance distribution. Data used by the pre-gamma conversion unit 620 is pre-gamma data 621 stored in the ROM 410. The digital image data that has undergone the pre-gamma conversion is input to a color correction processing unit 630, and converted to obtain preferable colors.

The color correction processing unit 630 performs color correction processing to make the colorimetric values (for example, CIE-L*a*b*) of color patches on the image original and device RGB output signals obtained by reading the color patches match RGB values corresponding to the colorimetric values in a predetermined color space. As the predetermined color space, for example, sRGB is used. The color correction processing is executed using known arithmetic processing or a one- to three-dimensional LUT. The color correction processing unit 630 also copes with the metamerism. The color correction processing unit 630 uses color correction data 631 stored in the ROM 410 as the data of, for example, the one- to three-dimensional LUT.

The digital image data output from the color correction processing unit 630 is input to a filter processing unit 640. The filter processing unit 640 performs filter processing such as edge enhancement or noise reduction of the digital image data. Data used for the filter processing is filter data 641 stored in the ROM 410. The digital image data output from the filter processing unit 640 is input to a post-gamma conversion unit 650. The post-gamma conversion unit 650 finely tunes the luminance characteristic of the received digital image data again in accordance with the application purpose. Data used by the post-gamma conversion unit 650 is post-gamma data 651 stored in the ROM 410. The digital image data is output from the post-gamma conversion unit 650 to the interface control circuit 406. Setting the data from the ROM 410 to the respective processing units is implemented by causing the CPU 409 to read out and execute the contents of the control program 670.

The image processing unit 600 includes the color correction data change unit 660, and the ROM 410 includes the output vs. wavelength correlation data 661. These will be described in the following embodiments.

Several embodiments of LED emission wavelength estimation applied to the MFP apparatus having the above-described arrangement will be described next in detail.

First Embodiment

An LED emission wavelength estimation method will be explained first.

Figure 7:
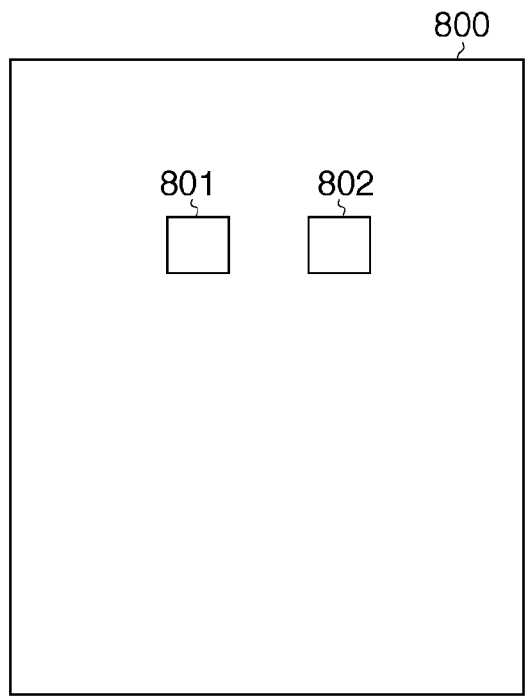
FIG. 7 is a view showing a color patch sheet for LED wavelength measurement.

FIG. 7 is a view showing a color patch sheet for LED wavelength measurement.

As shown in FIG. 7, an inkjet printer prints each of a magenta patch (M patch) 801 and a yellow patch (Y patch) 802 on a printing medium 800 such as glossy paper with high image quality using a maximum or almost maximum ink discharge amount per unit area. The maximum ink discharge amount is determined for each ink or printing medium within the bounds of not causing harmful effects on an image such as beading where ink overflows and forms drops on the paper surface and blurring of a printed pattern, or a phenomenon called cockling where a soaked printing medium waves. The color patch sheet can be either supplied in product packaging, or newly printed by the image printing unit 700 for LED wavelength measurement. The latter is preferable because the former may increase the product cost and degrade the color materials over time. The latter also has the problem of time-rate change of color materials after printing. Hence, the user is recommended to perform LED wavelength measurement after the elapse of a predetermined time from printing.

In an inkjet printer, generally, the ink discharge amount varies. This results in a variation in the spectral reflectivity, and the printing density and colors thus vary between individual printers. However, when the ink discharge amount is maximum or almost maximum (high density), a saturated condition is obtained in which the ink almost covers the printing medium. For this reason, the variation in the spectral reflectivity is small.

The color patch sheet is measured by a spectroreflectometer so as to obtain the spectrum of spectral reflectivity.

Figure 8:
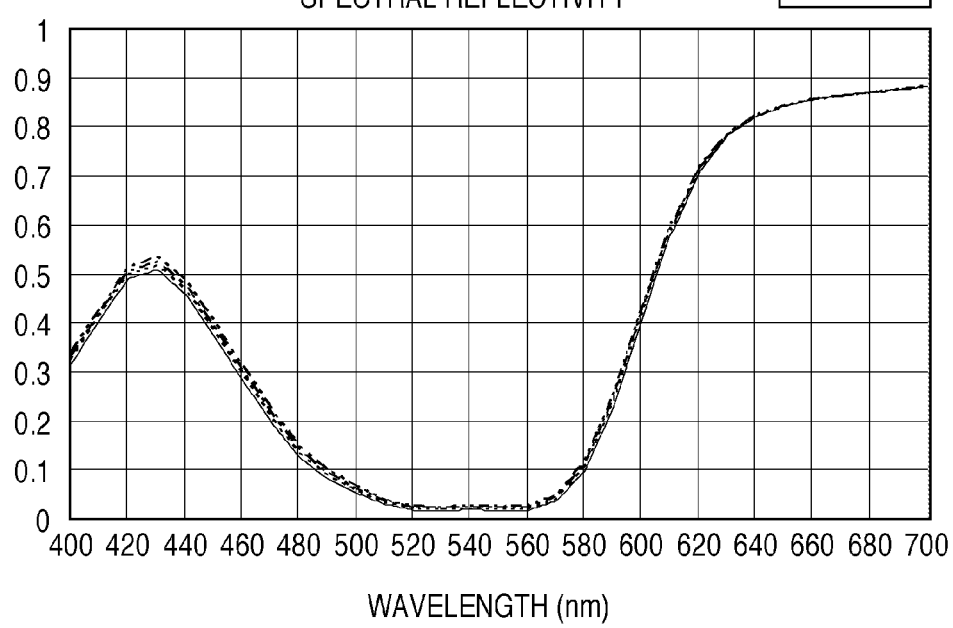
FIG. 8 is a graph showing a change in the spectral reflectivity with respect to the wavelength when the ink discharge amount of a magenta patch changes from the maximum to 91%.

FIG. 8 is a graph showing a change in the spectral reflectivity with respect to the wavelength when the ink discharge amount of the M patch 801 changes from the maximum (100%) to 91%. As is apparent from this graph, the variation in the spectral reflectivity is small even when the ink discharge amount actually changes. However, the variation in the sub-reflection region near 430 nm is slightly larger than that in the main reflection region at 600 nm or more. Note that in FIG. 8, the maximum discharge amount is defined as 100% in percentage, and a discharge amount smaller by 9% is defined as 91%.

Figure 9A:
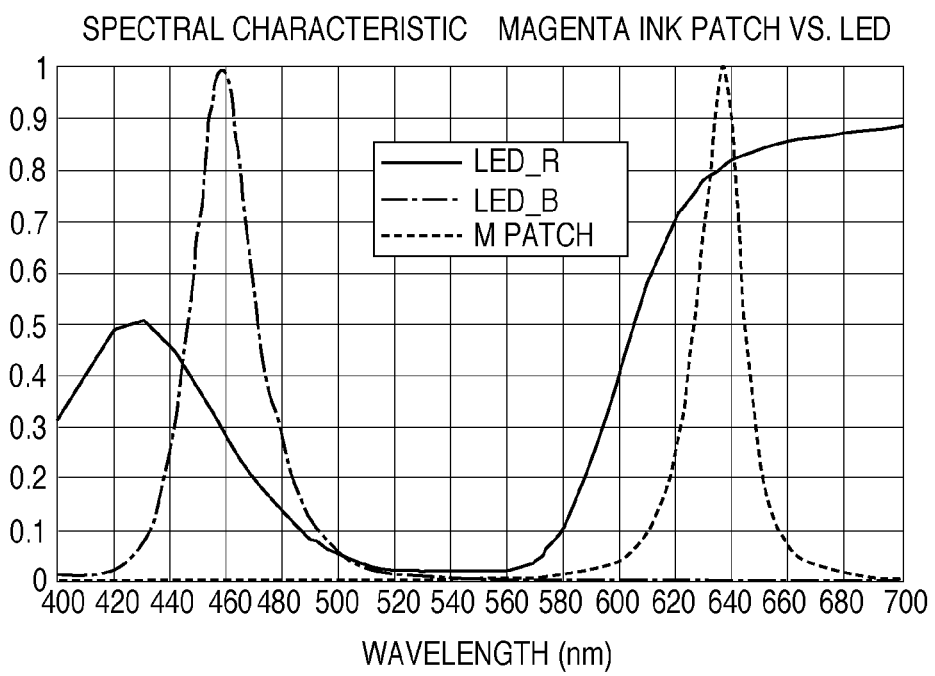
FIGS. 9A and 9B are graphs showing the spectral reflectivities of a magenta patch and a yellow patch and the emission wavelength characteristics of LEDs 303 to 305.
Figure 9B:
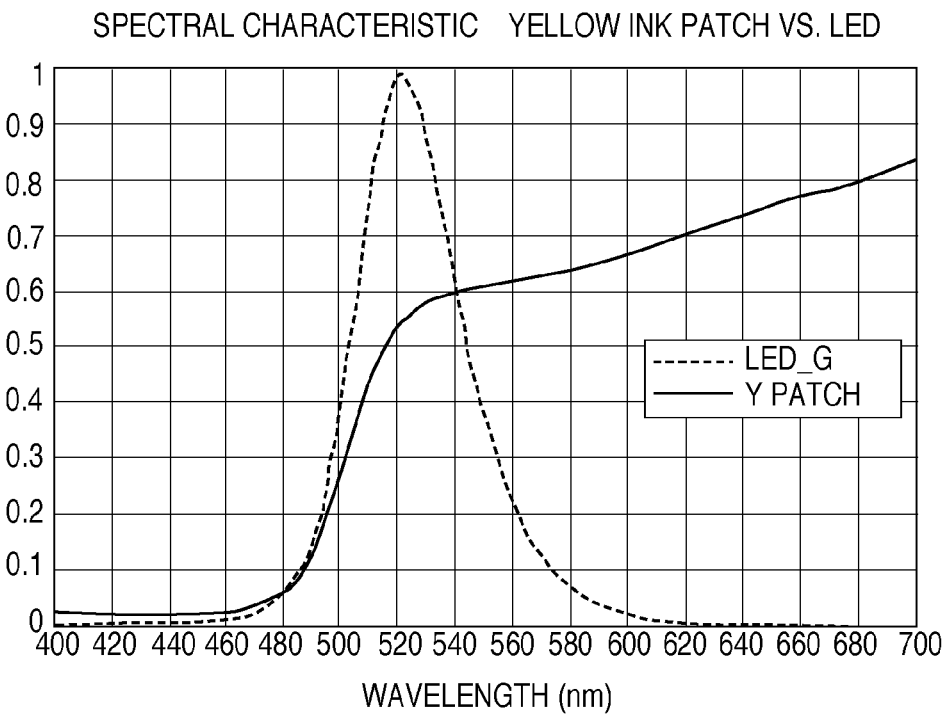

FIGS. 9A and 9B are graphs showing the spectral reflectivities of the M patch 801 and the Y patch 802 and the emission wavelength characteristics of the LEDs 303 to 305. The emission wavelength characteristic of an LED is obtained by measuring a standard design LED incorporated in an image reading apparatus or MFP using a measuring device such as an optical spectrum analyzer. Considering the variation in the LED emission wavelength, the measurement is performed by defining, as a reference, an LED having an emission wavelength at the center of the allowable variation. Generally, one-time measurement of LEDs of the same rating suffices. However, the accuracy of later estimation can be increased by measuring LEDs for each production lot.

FIG. 9A shows the spectral reflectivity of the M patch 801 at the maximum ink discharge amount (100%) and the emission wavelength characteristics of the LEDs 303 and 305. FIG. 9B shows the spectral reflectivity of the Y patch 802 and the emission wavelength characteristic of the LED 304.

As is apparent from FIG. 9A, the spectral reflectivity of the M patch 801 monotonously increases near the emission wavelength of the LED 303. Hence, in a case where the LED 303 irradiates the M patch 801, as the wavelength of the LED 303 shortens, the reflected light intensity becomes lower, and the value of the R output signal becomes smaller. As the wavelength becomes longer, the R output signal becomes larger. Note that the half width of the emission wavelength characteristic of the LED is also supposed to change. In this case, however, no problem is posed because the LED output itself changes in accordance with the half width, and the shading correction unit 610 corrects it. Similarly, the spectral reflectivity of the M patch 801 monotonously decreases near the emission wavelength of the LED 305. Hence, as the wavelength of the LED 305 shortens, the reflected light intensity becomes higher, and the B output signal becomes smaller. As the wavelength becomes longer, the B output signal becomes smaller.

As is apparent from FIG. 9B, the spectral reflectivity of the Y patch 802 monotonously increases near the emission wavelength of the LED 304. Hence, as the wavelength of the LED 304 shortens, the reflected light intensity becomes lower, and the G output signal becomes smaller. As the wavelength becomes longer, the G output signal becomes larger.

Figure 10:
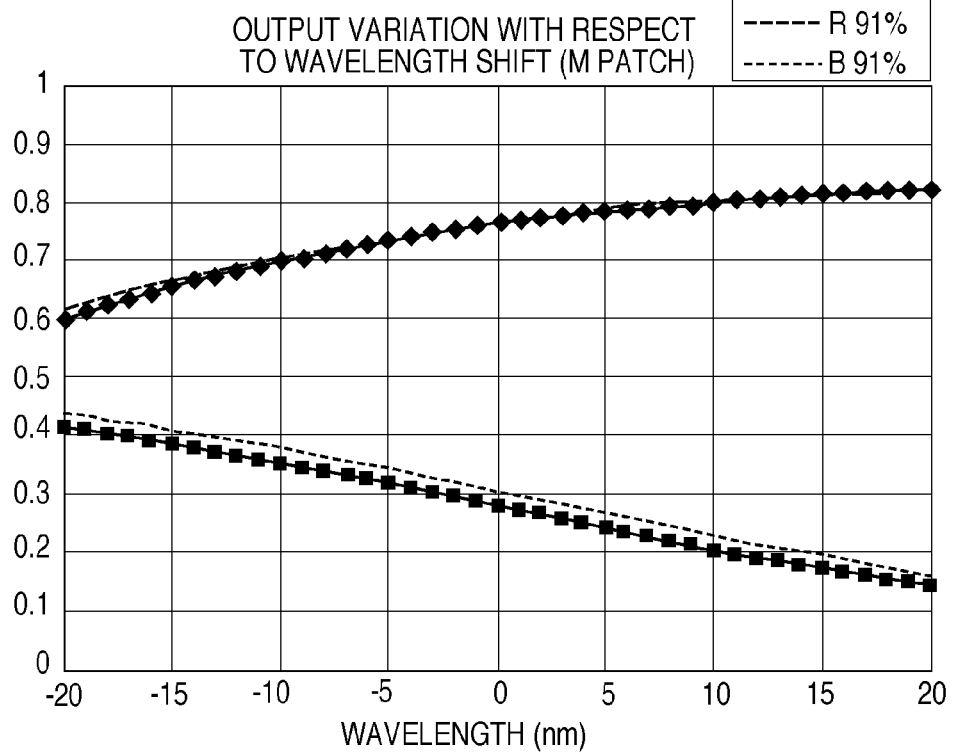
FIG. 10 is a graph showing changes in the output signals with respect to the wavelength shifts of the LEDs 303 and 305 when the magenta patch is printed and read at ink discharge amounts of 100% and 91%.

FIG. 10 is a graph showing changes in the output signals with respect to the wavelength shifts of the LEDs 303 and 305 when the M patch 801 is printed and read at ink discharge amounts of 100% and 91%. The output signal changes are obtained by convolution of the spectral reflectivity of the patch (test patch) and the emission wavelength characteristics of the LEDs. More specifically, an output in a case where the wavelength of an LED is slightly shifted in the + or − direction from its peak wavelength (that is, the wavelength shift is zero) in designing the apparatus is obtained by shifting the emission wavelength characteristic of the LED by an amount corresponding to the shift and convoluting it with the spectral reflectivity of the patch. Hence, FIG. 10 is obtained from the calculation result of convolution of the spectral reflectivity of the M patch and the emission wavelength characteristics of the LEDs 303 and 305 which are shifted by an amount corresponding to the shift.

Referring to FIG. 10, "1" on the ordinate represents a reflectivity of 100%, and a wavelength shift "0" on the abscissa represents the design wavelength (nominal wavelength) of the LED. As is apparent from FIG. 10, the R signal change characteristic changes little even when the ink discharge amount decreases to 91%. However, the B signal change characteristic slightly varies due to the influence of the variation in the sub-reflection region near 430 nm pointed out above. However, the wavelength estimation error caused by the variation is as small as about ±2 nm.

The color correction data change unit 660 and the output vs. wavelength correlation data 661 described concerning FIG. 6 will be explained here.

The relationship between output signals obtained by reading color patches and the wavelengths of the LEDs can be known in the above-described way. The signal change characteristics are stored in the ROM 410 as the output vs. wavelength correlation data 661 shown in FIG. 6 in advance. That is, the output vs. wavelength correlation data 661 is stored in the ROM 410 when manufacturing the MFP apparatus 100 or image reading apparatus 200 in a factory. Hence, test patch formation and output, measurement of test patch spectral reflectivities using a spectroreflectometer, measurement of the emission wavelength characteristics of reference LEDs, and generation of the output vs. wavelength correlation data 661 are performed at the stage of manufacturing the apparatus. The color correction data change unit 660 estimates the emission wavelengths of the LEDs based on signal outputs obtained by reading the M patch 801 and the Y patch 802 using the output vs. wavelength correlation data 661. The color correction data 631 is then changed based on the result in accordance with the emission wavelengths of the LEDs. To change the color correction data 631, for example, a method of changing the table values of the color correction data 631 themselves by calculation, or a method of preparing a plurality of color correction data and selecting one of them which matches the wavelength changes of the LEDs as much as possible is usable.

To cope with the problem of metamerism, the color correction data 631 is changed in accordance with the color material type of a target image original, such as a silver halide photo, inkjet printed product, or offset printed product, to be read. Methods of determining the color material type have already been described in "Description of the Related Art", and a detailed description thereof will not be repeated.

According to the above-described embodiment, estimating the emission wavelengths of light source LEDs makes it possible to always output predetermined device RGB signals and make them match RGB values in a predetermined color space even when the emission wavelengths of the LEDs vary.

In addition, it is possible to estimate, from the wavelength of each LED, the behavior of color change by the metamerism associated with the change of color materials for an image.

Second Embodiment

In the first embodiment, as described with reference to FIG. 10, when the ink discharge amount changes, for example, the wavelength estimation of the LED 305 still contains an error of about ±2 nm. In many cases, the error is sufficiently small. In the second embodiment, an LED wavelength estimation method for more accurate estimation will be described.

Figure 11:
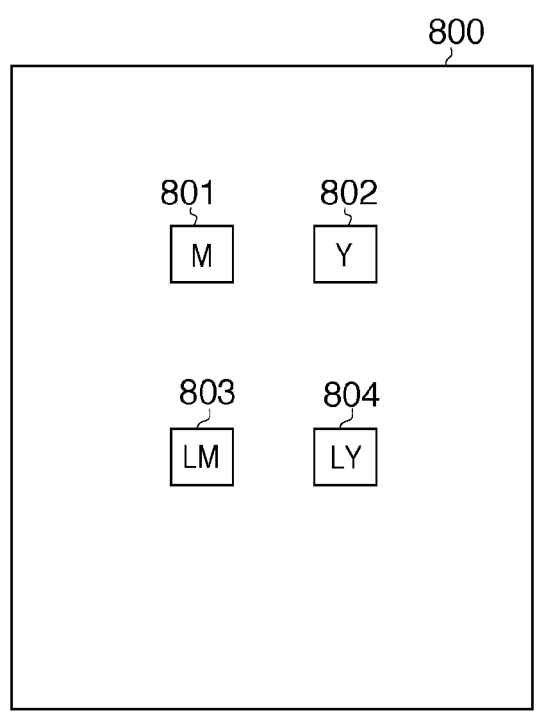
FIG. 11 is a view showing a color patch sheet used in the second embodiment.

FIG. 11 is a view showing a color patch sheet used in the second embodiment.

As is apparent from comparison between FIG. 11 and FIG. 7, a (light-colored) halftone magenta patch (LM patch) 803 at an ink discharge amount of 22% and a halftone yellow patch (LY patch) 804 at an ink discharge amount of 22% are additionally formed in this embodiment.

Figure 12A:
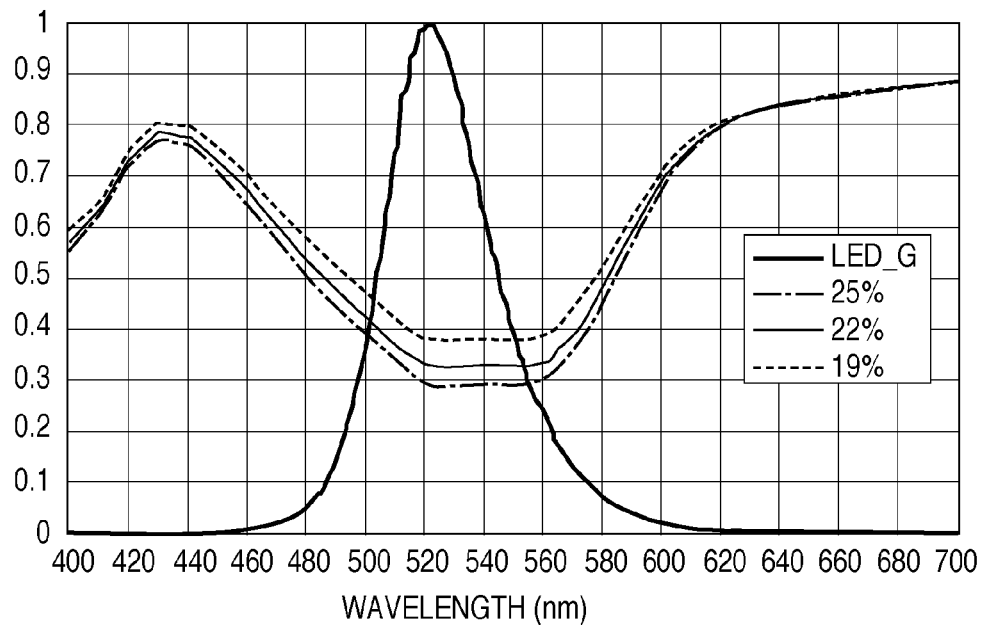
FIGS. 12A and 12B are graphs showing the spectral reflectivity of an LM patch with an ink discharge amount variation of about ±10% and LED output variations with respect to the wavelength shift.
Figure 12B:
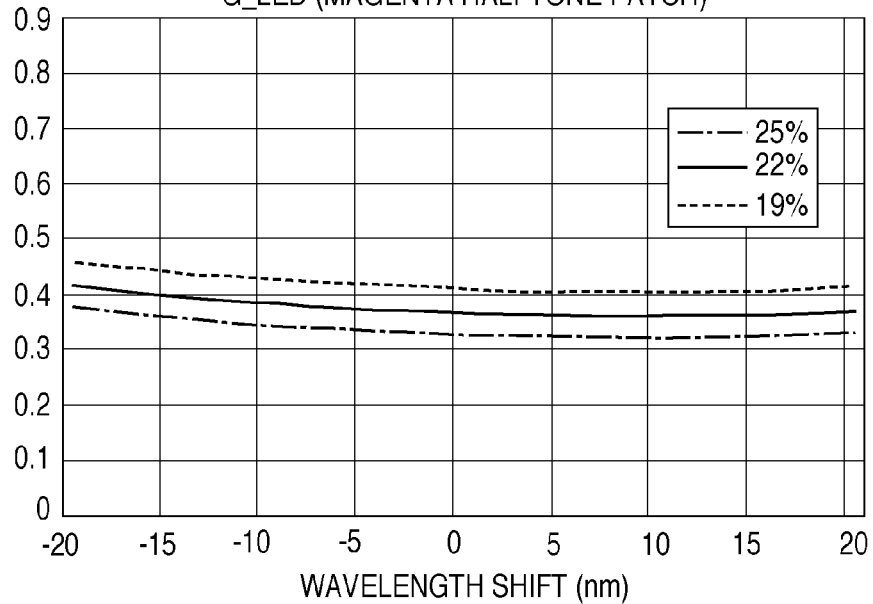

FIGS. 12A and 12B are graphs, respectively showing: the spectral reflectivity of an LM patch with an ink discharge amount variation of about ±10%; and LED output variations with respect to the wavelength shift.

FIG. 12A shows the spectral reflectivity of an LM patch with an ink discharge amount variation of about ±10% for an ink discharge amount of 22%, that is, the spectral reflectivities of LM patches at ink discharge amounts of 19% and 25%, and the emission wavelength characteristic of an LED 304. As is apparent from FIG. 12A, the spectral reflectivity of the LM patch 803 is almost flat near the emission wavelength of the LED 304, and increases or decreases in accordance with the variation in the ink discharge amount, as a whole.

FIG. 12B shows the relationship between the wavelength shift of the LED 304 and the output variations of the LED 304 for LM patches at ink discharge amounts of 19%, 22%, and 25%. As is apparent from FIG. 12B, even when the wavelength shift of the LED 304 occurs, the output value of the LED 304 hardly changes unless the ink discharge amount changes.

On the other hand, the wavelength of the LED 304 is obtained at an accuracy of about ±2 nm by measurement using a Y patch 802, as described in the first embodiment. When the error of ±2 nm is applied to FIG. 12B, since the variation in the LED output value is very small within the range of such wavelength shift, the variation amount of the ink discharge amount can be estimated at a considerably high accuracy. The main cause of the variation in the ink discharge amount is known to be a head manufacturing error, such as a hole diameter of each discharge nozzle of the inkjet printhead or a heater for heating ink in a thermal inkjet printer. Hence, it is considered that there is a correlation between the variation in the ink discharge amount for forming the LM patch 803 and the ink discharge amount for a 100% M patch 801.

Referring back to FIG. 10, when this embodiment is applied, wavelength measurement at a higher accuracy than in the first embodiment can be performed using the characteristic curve corresponding to the ink discharge amount upon estimating the wavelength of an LED 305. In this case, it is necessary for output vs. wavelength correlation data 661 to include data for each ink discharge amount.

Figure 13:
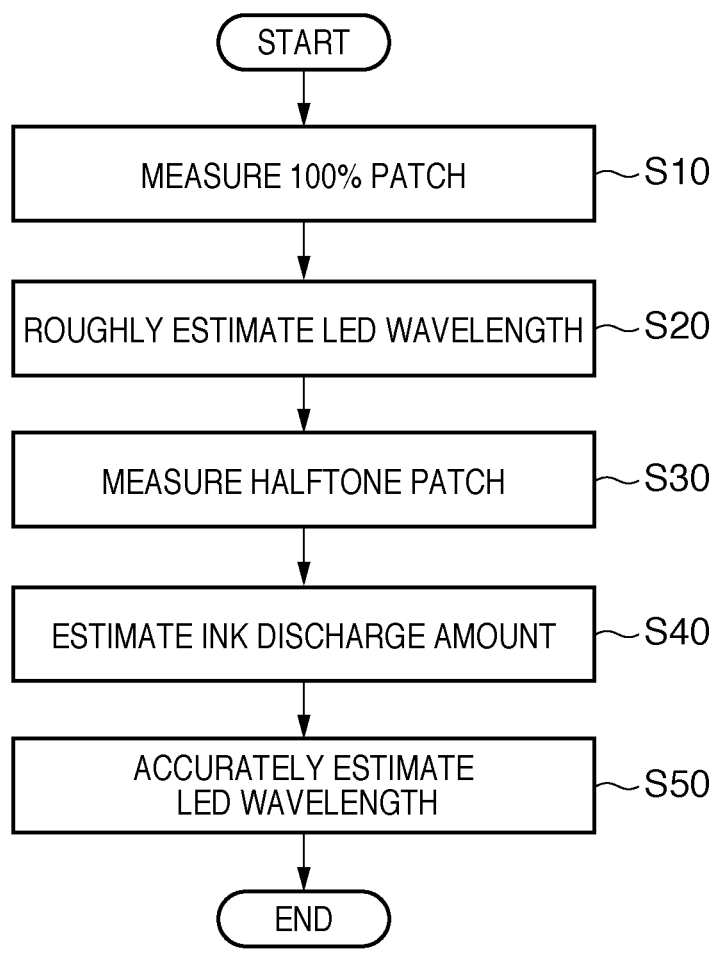
FIG. 13 is a flowchart illustrating LED emission wavelength estimation processing.

FIG. 13 is a flowchart illustrating LED emission wavelength estimation processing.

According to this flowchart, in step S10, for example, a patch forming unit such as an inkjet printer forms patches at the maximum ink discharge amount (100%), and the spectral reflectivities of the patches are measured. In step S20, output variations caused by the wavelength shift of the LEDs are obtained based on the spectral reflectivities measured in step S10. The emission wavelengths of the LEDs are estimated by an estimation unit such as a personal computer, from the variations.

In step S30, the above-described patch forming unit forms halftone patches (for example, the LM patch 803 and the LY patch 804), and the spectral reflectivities of the patches are measured. In step S40, the ink discharge amounts of the formed patches are estimated based on the spectral reflectivities measured in step S30. In step S50, the above-described estimation unit selects characteristic curves (curves of output variations with respect to the wavelength shift) corresponding to the ink discharge amounts, and estimates the emission wavelengths of the LEDs using the selected characteristic curves.

Note that in the above description, the LM patch 803 and the LED 304 are used to measure the LEDs 303 and 305. The LY patch 804 and the LED 305 can be used to measure the LED 304 in the same way.

With the above-described processing, the discharge amount from the inkjet printhead of an image printing unit 700 can also be measured at a high accuracy as compared to a case without LED wavelength measurement. It is, therefore, possible to calibrate an image printed by the image printing unit 700. There are a lot of conventional color correction techniques for calibration after the ink discharge amount has accurately been grasped, and a description thereof will be omitted here.

Third Embodiment

In the first and second embodiments, only one color patch is used to measure the emission wavelength of one LED. In the third embodiment, however, more accurate measurement is performed using two color patches. For example, when measuring the wavelength of an LED 305, not only an M patch 801 but also a Y patch 802 is also read.

Figure 14A:
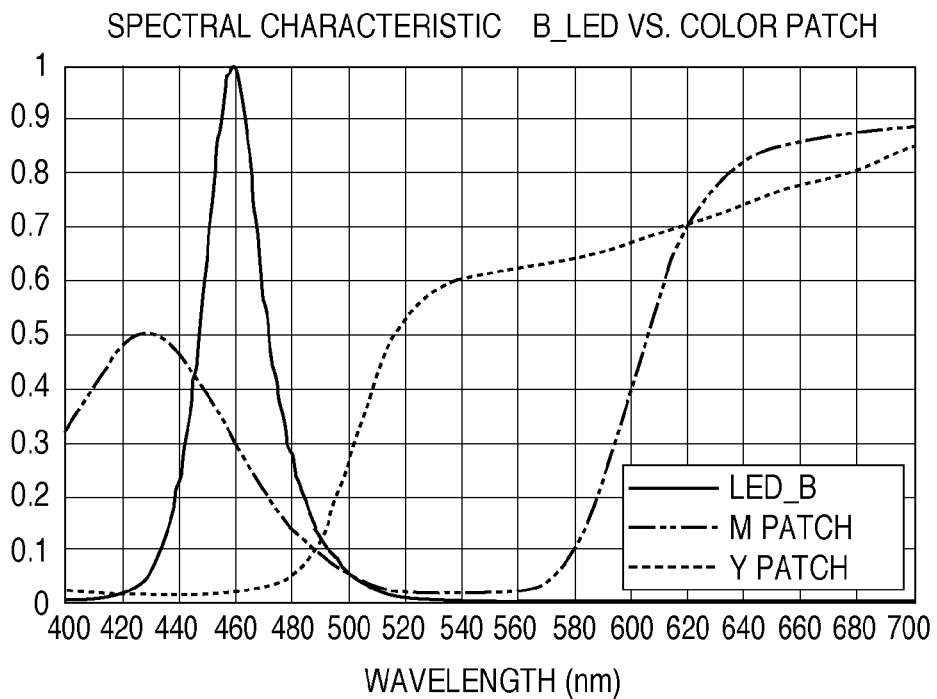
FIGS. 14A and 14B are graphs showing the emission wavelength characteristic of a blue LED, the spectral reflectivities of two color patches, and output variations with respect to the wavelength shift.
Figure 14B:
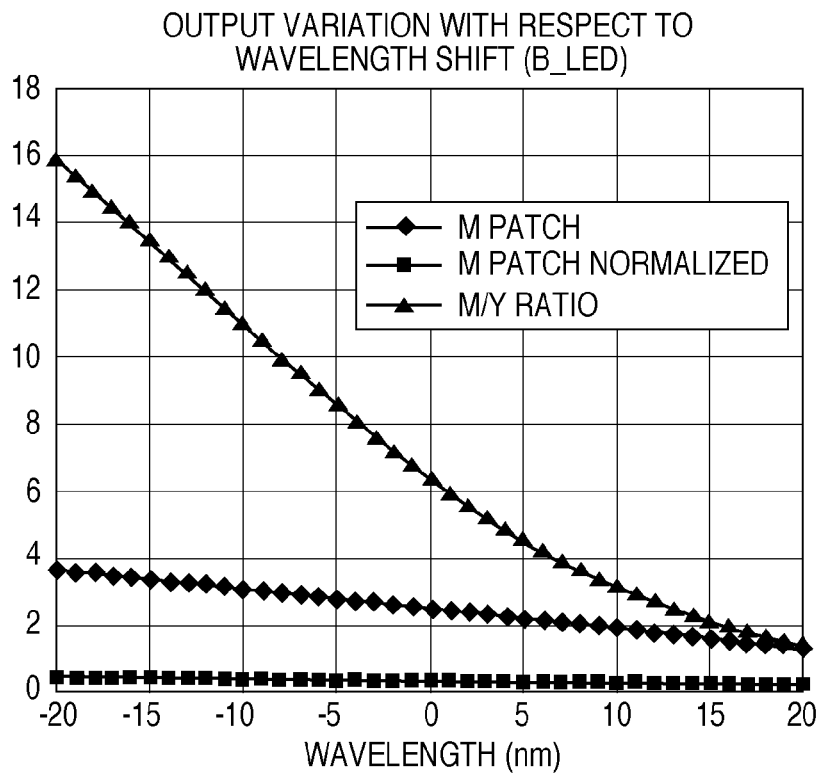

FIGS. 14A and 14B are graphs, respectively showing: the emission wavelength characteristic of a blue LED, and the spectral reflectivities of two color patches; and output variations with respect to the wavelength shift.

FIG. 14A shows the emission wavelength characteristic of the LED 305 and the spectral reflectivities of the M patch 801 and the Y patch 802. As is apparent from FIG. 14A, the spectral reflectivity of the M patch 801 monotonously decreases, and the spectral reflectivity of the Y patch 802 monotonously increases near the emission wavelength of the LED 305. That is, the spectral reflectivities of the two color patches exhibit behaviors opposite to each other. Thus, if the ratio (M/Y) is used, outputs with respect to the wavelength shift amount become more sensitive. As a result, the wavelength measurement accuracy can be increased.

FIG. 14B shows the output variation of the M/Y ratio with respect to the wavelength shift. Note that in FIG. 14B, the output value of only the M patch is normalized to a value when the wavelength shift is ±20 nm, for easier comparison.

As can be seen from the graph, in this embodiment, using the M/Y ratio makes the slope much larger than in a case wherein only the output value of the M patch 801 is used, as in the first and second embodiments. This can make the outputs with respect to the wavelength shift amount more sensitive and raise the wavelength measurement accuracy.

Figure 15A:
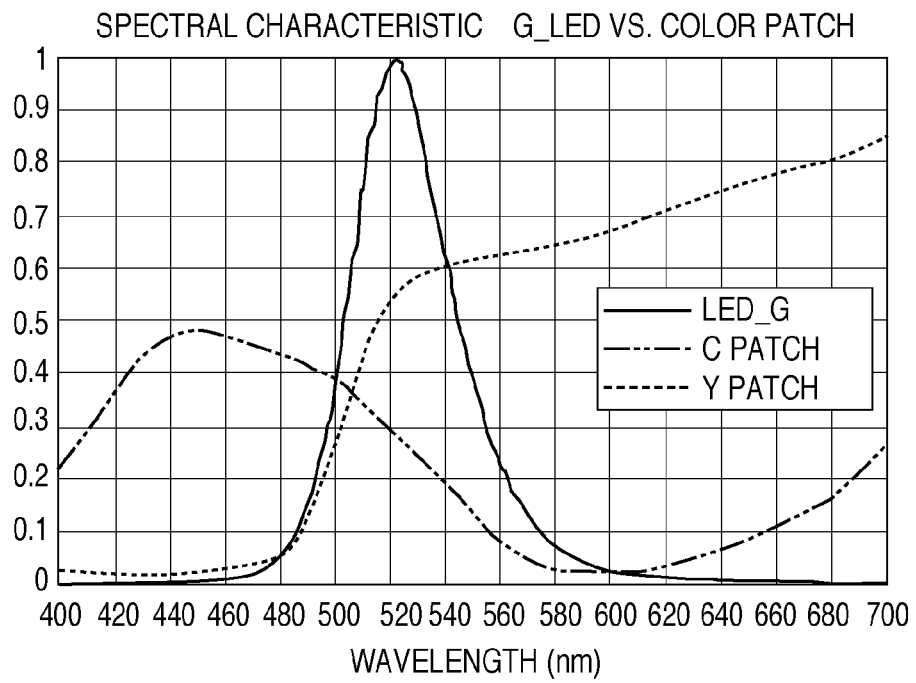
FIGS. 15A and 15B are graphs showing the emission wavelength characteristic of a green LED, the spectral reflectivities of two color patches, and output variations with respect to the wavelength shift.
Figure 15B:
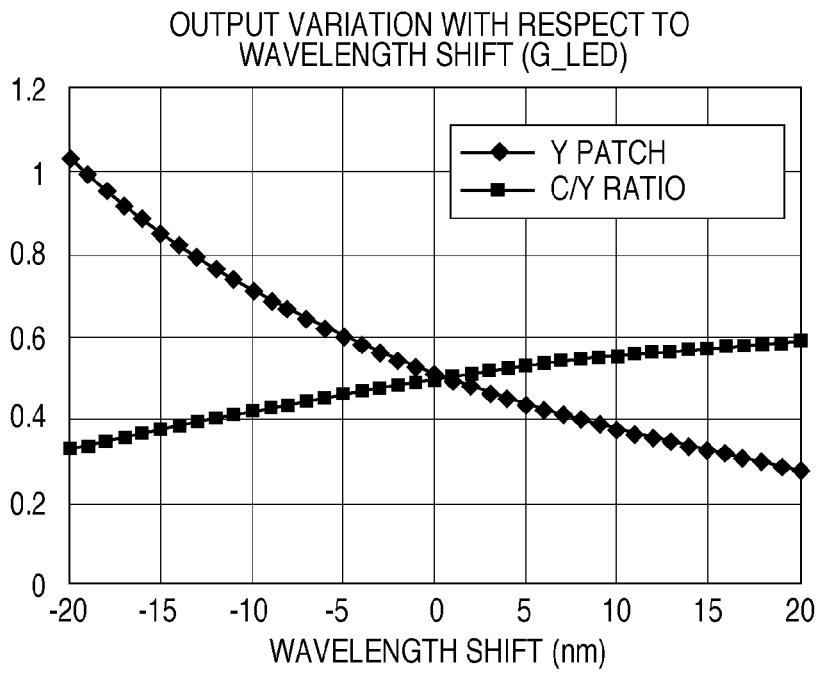

FIGS. 15A and 15B are graphs respectively showing: the emission wavelength characteristic of a green LED, and the spectral reflectivities of two color patches; and output variations with respect to the wavelength shift.

FIG. 15A shows the emission wavelength characteristic of an LED 304 and the spectral reflectivities of the Y patch 802 and a cyan ink patch (C patch). As shown in FIG. 15A, the spectral reflectivity of the cyan ink patch (not shown) at an ink discharge amount of 100% monotonously increases, and the spectral reflectivity of the Y patch 802 monotonously decreases near the emission wavelength of the LED 304. Hence, the spectral reflectivities of the two color patches exhibit behaviors opposite to each other. Thus, if the ratio (C/Y) is used, outputs with respect to the wavelength shift amount become more sensitive. As a result, accurate measurement is possible as compared to a case wherein only the output of the Y patch 802 is used.

FIG. 15B shows the output variation of the C/Y ratio with respect to the wavelength shift.

Note that for a red LED, no combination of two of the three 100% color patches of C, M, and Y can exhibit monotonously increasing and monotonously decreasing spectral reflectivities, unlike the LEDs 304 and 305. Hence, two color patches are not used for the red LED.

Note that in the above-described first to third embodiments, color patches at a discharge amount of almost 100% are used for LED wavelength measurement to maintain color stability in the inkjet printer. However, the present invention is not limited to this. For example, if any other means guarantees the color stability, as far as a monotonous spectral reflectivity in the emission wavelength range of an LED is maintained, another color ink is applicable. In this case, the ink discharge amount need not be 100%. Alternatively, patches formed by an electrophotographic printer using toners may be used.

The arrangement shown in FIG. 6 and the above-described processing according to the present invention can be provided in either a host computer or MFP apparatus, or may be implemented by an image forming apparatus which integrates all the components. The output vs. wavelength correlation data 661 is stored in the ROM. However, an MFP having a magnetic disk memory may store the data in the magnetic disk.

Wavelength measurement of LEDs has been described above. However, the present invention is applicable not only to the LEDs but also to any other light-emitting elements having half widths that are narrow to some extent, like the RGB LEDs, and emission wavelengths that are almost independent from each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-182889, filed Aug. 5, 2009, which is hereby incorporated by reference herein in its entirety.

What is claimed is:

1. An LED emission wavelength estimation method of estimating emission wavelengths of three LEDs which are mounted in an image reading apparatus to emit light of three primary colors, comprising:

a test patch formation step of forming a test patch by printing on a printing medium using color materials;

a first measurement of measuring a spectral reflectivity of the test patch formed on the printing medium using a spectroreflectometer;

a second measurement of measuring emission wavelength characteristics of standard LEDs mounted in the image reading apparatus using a measuring device;

a storage step of storing, into a memory, signal change characteristic data representing a relationship between signals corresponding to reflected light obtained by irradiating the test patch with the standard LEDs and a wavelength shift from a design wavelength of each of the standard LEDs, based on the spectral reflectivity measured in the first measurement step and the emission wavelength characteristics of the standard LEDs measured in the second measurement step;

a patch formation step of forming a patch by printing on a printing medium using color materials;

a reading step of reading the patch formed in the patch formation step, using the image reading apparatus including the memory and the three color LEDs; and an estimation step of estimating a wavelength shift from a design wavelength of each of the LEDs of the image reading apparatus, based on a signal obtained by reading the patch in the reading step and the signal change characteristic data stored in the memory.

2. The method according to claim 1, wherein
in the test patch formation step, the test patch is a high-density magenta patch formed by magenta ink, and
in the first measurement step, a blue LED and a red LED irradiate the high-density magenta patch.

3. The method according to claim 2, wherein
a spectral reflectivity of the magenta patch monotonously decreases near a wavelength of the blue LED, and
the spectral reflectivity of the magenta patch monotonously increases near a wavelength of the red LED.

4. The method according to claim 2, wherein
in the test patch formation step, the test patch is a high-density yellow patch formed by yellow ink, and
in the first measurement step, a green LED irradiates the high-density yellow patch.

5. The method according to claim 4, wherein a spectral reflectivity of the yellow patch monotonously increases near a wavelength of the green LED.

6. The method according to claim 2, wherein
in the test patch formation step, a halftone magenta patch is further formed, and
in the first measurement step, a spectral reflectivity of the halftone magenta patch is measured.

7. The method according to claim 4, wherein
in the test patch formation step, a halftone yellow patch is further formed, and
in the first measurement step, a spectral reflectivity of the halftone yellow patch is measured.

8. The method according to claim 1, wherein the signal change characteristic data is obtained by convolution of the spectral reflectivity of the test patch and an emission wavelength characteristic obtained by slightly shifting the emission wavelength characteristics of the standard LEDs.

9. An image reading apparatus which irradiates an image original with three LEDs for emitting light of three primary colors, receives reflected light of the light, and reads the image original based on the received light, comprising:
a color correction unit configured to perform color correction of the read image original, based on a signal change characteristic stored in a memory in accordance with a method according to claim 1.

10. A multifunction printer apparatus comprising:
an image reading apparatus according to claim 9; and
a printing unit configured to print an image on a printing medium, based on one of image data representing an image read by said image reading apparatus and externally input image data.

11. A printing apparatus comprising:
a printing unit configured to print an image on a printing medium by applying one or more printing materials to the printing medium;
a test patch formation unit configured to cause the printing unit to print a test patch on the printing medium by applying a predetermined color printing material of the one or more printing materials to the printing medium such that a test patch formation area on the printing medium is filled with the predetermined color printing material;
a measurement unit configured to measure the test patch formed on the printing medium using a light of an LED; and an obtaining unit configured to obtain information on emission characteristic of the LED.

12. The apparatus according to claim 11, wherein the information on emission characteristic of the LED is information on a difference between the emission characteristic of the LED and that of a standard LED.

13. The apparatus according to claim 11, further comprising a determination unit configured to determine an amount of the one or more printing materials to be applied to the printing medium by the printing unit,
wherein the test patch formation unit is further configured to cause the printing unit to print a test patch which is to be used by the determination unit,
the measurement unit is further configured to measure the test patch which is to be used by the determination unit, by the light of the LED, and
the determination unit is further configured to determine the amount, based on the information on emission characteristic of the LED obtained by the obtaining unit and a result of measuring the test patch which is to be used by the determination unit by the measurement unit.

14. The apparatus according to claim 11, wherein a wavelength in which the emission characteristic of the LED used for measuring the test patch reaches a peak falls within a range of wavelengths where a spectral reflectivity of the predetermined color printing material of the test patch monotonously increases or decreases according to a wavelength of a light.

15. The apparatus according to claim 13, wherein a wavelength, in which the emission characteristic of the LED used for measuring the test patch which is to be used by the determination unit, by the measurement unit reaches a peak, falls within a range of wavelengths where a spectral reflectivity of the amount of the one or more printing materials determined by the determination unit does not substantially change according to a wavelength of a light.

16. The apparatus according to claim 14, wherein the test patch printed by the predetermined color printing material is a magenta color test patch, and
the magenta color test patch is measured by a blue LED and a red LED.

17. The apparatus according to claim 14, wherein the test patch printed by the predetermined color printing material is a yellow color test patch, and
the yellow color test patch is measured by a green LED.

18. The apparatus according to claim 15, wherein the test patch used for determining the amount of the one or more printing materials is a magenta color test patch, and
the magenta color test patch is measured by a green LED.

19. A printing apparatus comprising:
a printing unit configured to print an image on a printing medium by applying one or more printing materials to the printing medium;
a test patch formation unit configured to cause the printing unit to print a first test patch and a second test patch having a density lower than that of the first test patch on the printing medium by applying a predetermined color printing material of the one or more printing materials to the printing medium such that a test patch formation area on the printing medium is filled with the predetermined color printing material;
a measurement unit configured to optically measure the first and second test patches formed on the printing medium; and
a determination unit configured to determine an amount of the one or more printing materials to be applied to the printing medium for printing the image by the printing unit, based on a measurement result of the first and second test patches optically measured by the measurement unit.

20. The apparatus according to claim 19, wherein the determination unit is further configured to determine the amount, based on the information on a difference between optical characteristic of the measurement unit and that of a standard light source.

21. The apparatus according to claim 19, wherein the measurement unit is further configured to measure the first and second test patches formed on the printing medium using a light of an LED.

22. The apparatus according to claim 19, wherein the test patch formation unit is further configured to cause the printing unit to print the second test patch after the measurement unit optically measures the first test patch.

23. The apparatus according to claim 19, wherein the second test patch is a halftone patch.

24. The apparatus according to claim 19, wherein a density of the predetermined color printing material in the first test patch is saturated.

25. A printing apparatus comprising:
a printing unit configured to print an image on a printing medium by applying one or more printing materials to the printing medium;
a test patch formation unit configured to cause the printing unit to print a test patch on the printing medium by applying a predetermined color printing material of the one or more printing materials to the printing medium such that a test patch formation area on the printing medium is filled with the predetermined color printing material;
a measurement unit configured to optically measure the test patch formed on the printing medium; and
an obtaining unit configured to obtain information relating to optical characteristic of the measurement unit.

26. The apparatus according to claim 25, wherein the predetermined color printing material is ink.

27. The apparatus according to claim 25, wherein a density of the predetermined color printing material in the test patch is saturated.

28. The apparatus according to claim 25, wherein the measurement unit is further configured to measure the test patch formed on the printing medium using a light of an LED, and
the information relating to optical characteristic of the measurement unit is information on a shift amount of a wavelength of the LED to that of a standard LED.

29. A printing method in a printing apparatus including a printing unit configured to print an image on a printing medium by applying one or more printing materials to the printing medium comprising:
causing the printing unit to print a first test patch and a second test patch having a density lower than that of the first test patch on the printing medium by applying a predetermined color printing material of the one or more printing materials to the printing medium such that a test patch formation area on the printing medium is filled with the predetermined color printing material;
optically measuring the first and second test patches formed on the printing medium by a measurement unit; and
determining an amount of the one or more printing materials to be applied to the printing medium for printing the image by the printing unit, based on a measurement result of the first and second test patches optically measured by the measurement unit.

30. The method according to claim 29, wherein in the determining step, the amount is determined, based on the information on a difference between optical characteristic of the measurement unit and that of a standard light source.

31. The method according to claim 29, wherein the measurement unit measures the first and second test patches formed on the printing medium using a light of an LED.

32. The method according to claim 29, wherein the second test patch is printed by the printing unit after the measurement unit optically measures the first test patch.

33. The method according to claim 29, wherein the second test patch is a halftone patch.

34. The method according to claim 29, wherein a density of the predetermined color printing material in the first test patch is saturated.

35. A printing method in a printing apparatus including a printing unit configured to print an image on a printing medium by applying one or more printing materials to the printing medium comprising:
causing the printing unit to print a test patch on the printing medium by applying a predetermined color printing material of the one or more printing materials to the printing medium such that a test patch formation area on the printing medium is filled with the predetermined color printing material;
optically measuring the test patch formed on the printing medium by a measurement unit; and
obtaining information relating to optical characteristic of the measurement unit.

36. The method according to claim 35, wherein the predetermined color printing material is ink.

37. The method according to claim 35, wherein a density of the predetermined color printing material in the test patch is saturated.

38. The method according to claim 35, wherein the measurement unit measures the test patch formed on the printing medium using a light of an LED, and
the information relating to optical characteristic of the measurement unit is information on a shift amount of a wavelength of the LED to that of a standard LED.

* * * * *